Figure 1:
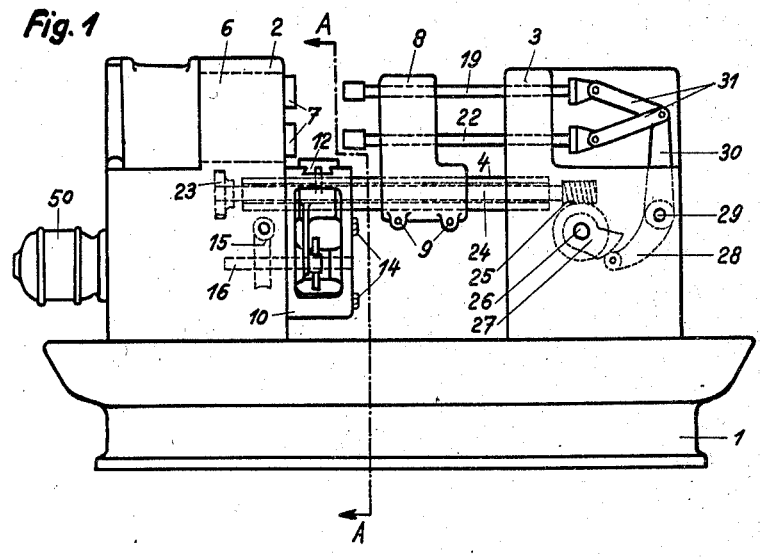

Feb. 1, 1944.        E. KOHRING        2,340,538
MULTISPINDLE AUTOMATIC LATHE
Filed Dec. 13, 1940        2 Sheets-Sheet 1

Feb. 1, 1944.  E. KOHRING  2,340,538
MULTISPINDLE AUTOMATIC LATHE
Filed Dec. 13, 1940  2 Sheets-Sheet 2

Patented Feb. 1, 1944

2,340,538

UNITED STATES PATENT OFFICE 2,340,538

MULTISPINDLE AUTOMATIC LATHE

Erwin Kohring, Cologne-Poll, Germany; vested in the Alien Property Custodian

Application December 13, 1940, Serial No. 370,078
In Germany December 22, 1939

5 Claims. (Cl. 29—37)

In order to obtain in multi-spindle automatic lathes with feeding spindle-drum having high output also a great accuracy of the works, it is necessary, that the machine body accommodating the gear elements and tools forms a rigid unit completely protecting and absolutely unsensitive against giving way also of the upper works. With this object in view it has already been proposed, to construct the machine body as a frame, in that the gap between the upper works is bridged on their upper parts by beam or frame stays and the longitudinal carriage and feeding gear elements are mounted on these staying elements.

The known propositions are, however, accompanied by the inconvenience, that the connecting beam seriously impairs for eye and hand the remaining free space between the upper works, that is, impairs especially in multi-spindle automatic lathes of small and deep construction, the clearness of arrangement of the shavings room inside the machine body.

If, however, according to the invention the staying between the upper works is constructed of several parts, for instance as a pair of hollow bodies of preferably cylindrical cross-section arranged below and at the side of the spindle drum, and if their ends are connected, for instance by inserting the same, with the inwardly directed front faces of the corresponding upper work boxes, the above mentioned inconveniences are avoided, and such a staying of or connection between the upper works of the machine body can besides be produced very accurately and therefore very easily and economically. Especially the upper zone of the shavings room is thereby not impeded in the least by the staying space for the adjusting of the tools, and the advantage is even obtained that movements from one upper work to the other can be brought about by the hollow bodies. These moving elements, whether mechanically or hydraulically operated, are enclosed capsule-like by the staying bodies and thus protected against the fall of shavings, and they enable the transmission of gear branches without complicated and expensive leading off from the most favorable point to other points with exclusion of any disturbing impairing for the surveying of the operation.

The arrangement according to the invention makes it further possible, to utilize the staying bodies for the good mounting and guiding of machine elements necessary for the service, for instance of the tool carriers for the longitudinally moved tools, and the supporting bracket for the transverse carriage can be accommodated by one of the stayings and can be adjusted or secured in different position, or the hollow bodies may be made useful for the longitudinal shifting of the longitudinal and transverse carriages, according to the work to be carried out.

Figure 2:
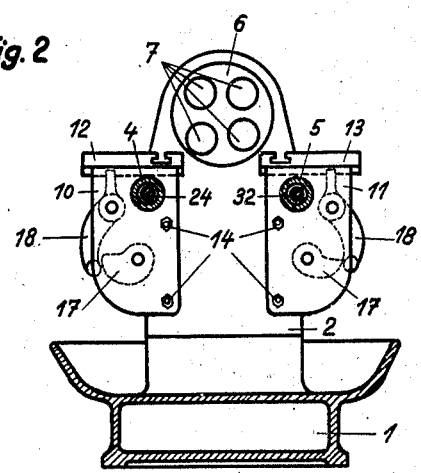
Figure 3:
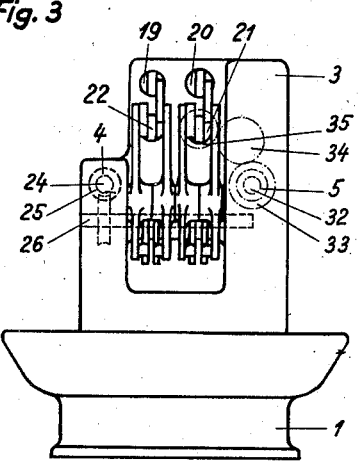
Figure 4:
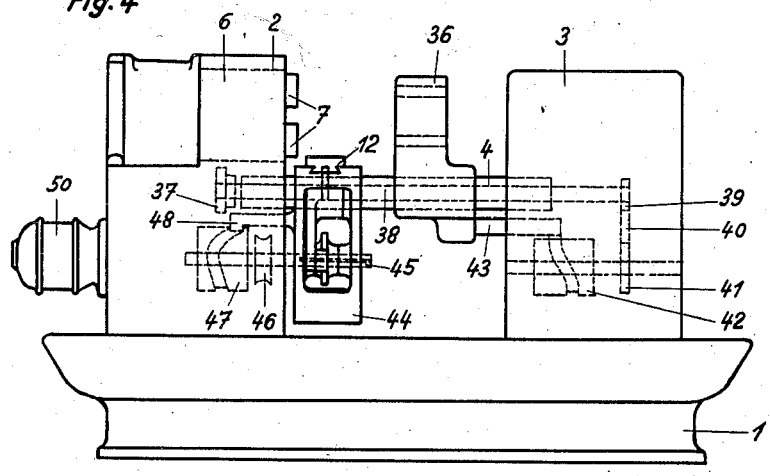

An embodiment of the invention is illustrated by way of example in the accompanying drawings, in which Fig. 1 shows a four-spindle automatic lathe in front elevation with fixed tool carrier for the tools moved in longitudinal direction and with stationary bracket for the transverse carriage, Fig. 2 is a cross-section on line A—A of Fig. 1, Fig. 3 shows the automatic lathe in front elevation viewed from the right hand side of Fig. 1, and Fig. 4 shows the four-spindle automatic lathe, but with longitudinal or transverse carriage arranged on the staying bodies so that the carriages can be moved in longitudinal direction.

In Figs. 1 to 3 the numeral 1 designates the lower bed part, 2 the left hand and 3 the right hand box-shaped upper work. The driving engine 50 is mounted on the left hand box-shaped upper work 2, while the spindle-drum 6 is mounted in the upper work 2 and progressively moves from one operating position into the other. As shown in Figs. 1 and 2, the spindle-drum carries four revolving working spindles 7. As shown in Figs. 2 and 3 two cylindrical, hollow staying bodies 4 and 5 are arranged below and at the side of the spindle-drum 6 and effect a rigid spar-like connection between the upper works 2 and 3, the ends of these staying bodies being detachably fixed in the corresponding inward front walls of the upper works. The tool carrier 8 is supported on the staying bodies 4 and 5 and can be secured in position on these staying bodies by means of clamping screws 9 shown in Fig. 1. The reference characters 10 and 11 designate two supporting brackets carrying the transverse carriages 12 and 13, the staying bodies extending through the upper part of these brackets 10 and 11, whereas the lower parts of these brackets are fixed by means of screws 14 on the front wall of the box-shaped upper work 2. If desired, spacing plates not shown and which may be of any desired thickness may be associated with the screws 14 and upper work 2.

The transverse carriages 12, 13 are driven in known manner by worm drives 15 through the intermediary of cam shaft 16, cam disc 17 and a lever 18 hingedly mounted in the brackets 10 and 11 respectively, the other ends of said levers respectively engaging on the corresponding transverse carriage 12 and 13. The feed drive of the tool axles 19, 20, 21, 22 extending through the tool carrier 8 is effected for instance from the front-side staying body 4 by means of a shaft 24 extending through this staying body and by means of the toothed wheel 23 mounted on this shaft, through the intermediary of a worm drive 25, a cam shaft 26, cams 27 fixed on this shaft 26 and by four levers 28 to 30 oscillating each one about the fixed axle 29, by four other lever rods 31 hingedly connected with the four levers 28 to 30. Each of these lever rods is hingedly connected with the corresponding end of the tool axles 19, 20, 21, 22. One of the tool axles, in the example shown the axle designated by 21, has to serve as rapid boring spindle and therefore must carry out a revolving movement besides its shifting movement in longitudinal direction. This is effected from the staying body 5 which is the rear one relative to the upper work of the machine by the shaft 32 extending in longitudinal direction through the staying body 5 and through the intermediary of toothed wheels 33, 34 and 35, as shown in Fig. 3.

If the tool carrier 36, as shown in Fig. 4, is to be equipped with clamped-in tools, not shown, and if longitudinal shifting movements have to be imparted to the same, the staying bodies 4 and 5 serve as sliding guides for the carriage 36. The drive is then effected by a spur wheel 37 keyed on the end of a shaft 38 extending through the longitudinal channel of the staying body and by a spur wheel 39 fixed on the other end of the shaft and meshing with spur wheels 40, 41 through the intermediary of a cam disc 42 keyed on the shaft of the spur wheel 41 by an arm 43, mounted on the longitudinal carriage 36 and carrying a cam engaging in the curved groove of drum 42.

In a similar manner the staying body 4 may be utilized as sliding carrier for shifting the supporting bracket 44 in longitudinal direction, as shown in Fig. 4, in cooperation with a shaft 45 extending through the bracket stays, the drive being then effected by a worm gear 46, a cam drum 47 and a shifting arm 48 mounted on the bracket 44 and having a cam engaging in the groove of the cam drum.

I claim:

1. A multi-spindle automatic lathe with feeding spindle-drum and box-shaped upper works with a gap between said upper works being bridged by a rigid staying, comprising in combination with the spindle-drum, several hollow bodies of preferably cylindrical cross-section arranged below and at the side of said spindle-drum and securely but detachably fixed at their ends on the corresponding upper works, the staying bodies forming casings, shafts located in said staying bodies, and gears mounted on said shafts and operative for effecting certain operation movements from one upper work to the other.

2. A multi-spindle automatic lathe with feeding spindle-drum and box-shaped upper works with a gap between said upper works being bridged by a rigid staying, comprising in combination with the spindle-drum, several hollow bodies of preferably cylindrical cross-section arranged below and at the side of said spindle-drum and securely but detachably fixed at their ends on the corresponding upper works, a carrier for longitudinal tools arranged between the upper works, and said staying bodies extending through said carrier.

3. A multi-spindle automatic lathe with feeding spindle-drum and box-shaped upper works with a gap between said upper works being bridged by a rigid staying, comprising in combination with the spindle-drum, several hollow bodies of preferably cylindrical cross-section arranged below and at the side of said spindle-drum and securely but detachably fixed at their ends on the corresponding upper works, transverse carriages associated with one of said upper works, supporting brackets for the transverse carriages, the staying bodies extending through the upper portion of said brackets, a part of the lower surface of said supporting brackets being fixed on the walls of said upper works facing the supporting brackets.

4. A multi-spindle automatic lathe with feeding spindle-drum and box-shaped upper works with a gap between said upper works being bridged by a rigid staying, comprising in combination with the spindle-drum, several hollow bodies of preferably cylindrical cross-section arranged below and at the side of said spindle-drum and securely but detachably fixed at their ends on the corresponding upper works, transverse carriages associated with one of said upper works, supporting brackets for the transverse carriages, the staying bodies extending through the upper portion of said brackets, a part of the lower surface of said supporting brackets being fixed on the walls of said upper works facing the supporting brackets, and an intermediate plate of desired thickness interposed between said fixed part of the lower surface of said supporting brackets and the corresponding wall of the upper works.

5. A multi-spindle automatic lathe with feeding spindle-drum and box-shaped upper works with a gap between said upper works being bridged by a rigid staying, comprising in combination with the spindle-drum, several hollow bodies of preferably cylindrical cross-section arranged below and at the side of said spindle-drum and securely but detachably fixed at their ends on the corresponding upper works, a longitudinal carriage carrying tools and mounted on said staying bodies, a transverse carriage, supporting brackets for said transverse carriage, the upper portion of said supporting brackets being mounted on one of said staying bodies, and an additional guide adapted to shift said upper portion of the supporting brackets for said transverse carriage.

ERWIN KOHRING.